United States Patent
Ma et al.

(10) Patent No.: US 10,222,259 B1
(45) Date of Patent: Mar. 5, 2019

(54) OPTICAL PROBE OF SPECTRORADIOMETER

(71) Applicant: Apacer Technology Inc., New Taipei (TW)

(72) Inventors: Tzu-I Ma, New Taipei (TW); Ming-Chung Cheng, Taichung (TW); Jin-Cherng Hsu, New Taipei (TW)

(73) Assignee: Apacer Technology Inc., New Taipei (TW)

( * ) Notice: Subject to any disclaimer, the term of this patent is extended or adjusted under 35 U.S.C. 154(b) by 0 days.

(21) Appl. No.: 15/896,351

(22) Filed: Feb. 14, 2018

(51) Int. Cl.
  *G01J 3/02* (2006.01)
  *G02B 6/04* (2006.01)

(52) U.S. Cl.
  CPC .......... *G01J 3/0218* (2013.01); *G01J 3/0202* (2013.01); *G01J 3/0208* (2013.01); *G01J 3/0272* (2013.01); *G02B 6/04* (2013.01); *G01J 2003/0281* (2013.01)

(58) Field of Classification Search
  CPC ...... G01J 3/0218; G01J 3/0202; G01J 3/0272; G01J 3/0208; G01J 2003/0281
  See application file for complete search history.

(56) References Cited

U.S. PATENT DOCUMENTS 4,964,692 A * 10/1990 Prescott ............... G02B 6/0008
  362/554
5,835,289 A * 11/1998 Berry ....................... G02B 7/14
  359/822

\* cited by examiner

*Primary Examiner* — Jerry Rahll
(74) *Attorney, Agent, or Firm* — Winston Hsu

(57) ABSTRACT

An optical probe has a connecting part, a carrier, multiple optical fibers, and a lens hood. The carrier is inserted in the connecting part. The carrier has two opposite ends and a channel. The channel extends to the two opposite ends of the carrier. The multiple optical fibers are inserted in the channel of the carrier. The lens hood is connected to the connecting part. The multiple optic fibers inserted inside the channel are able to cover various orientations of oscillations of polarized light, promote accuracy of inspection result, and save a lot of time from repeated measuring.

12 Claims, 10 Drawing Sheets

OPTICAL PROBE OF SPECTRORADIOMETER

BACKGROUND OF THE INVENTION

1. Field of the Invention

The present invention relates to a spectroradiometer for measuring spectral power distribution, and more particularly to an optical probe of a spectroradiometer that is able to inspect display panels rapidly and accurately.

2. Description of Related Art

A spectroradiometer is a device for inspecting various kinds of display panels. The spectroradiometer is able to measure spectral power distributions of display panels. The display panels may be liquid-crystal displays, a plasma displays, or organic light-emitting diode panels. In order to lower down interference caused by reflection of light when people watch the display panels, light emitted by the display panels mentioned above is generally a polarized light to lower down interference caused by reflection of light.

Most lights are un-polarized and do not have particular orientation of oscillations. When an un-polarized light passes through an interface or a particular instrument with a specific angle, the un-polarized light is transformed into a polarized light that has a particular orientation of oscillation. The particular orientation of oscillation of the polarized light causes missing and errors of inspection and affects the inspection result of the spectroradiometer.

With reference to FIGS. 8 and 9, a conventional optical probe 90 of the spectroradiometer generally has three optic fibers 91. The three optic fibers 91 are inserted in the conventional optical probe 90 and are parallel to each other. When a polarized light enters the conventional optical probe 90, the orientation of oscillation of the polarized light may not be fully aligned with any one of the three optical fibers 91 or even completely deviate from the three optical fibers 91. Therefore, inspection results at a same position vary from time to time. With reference to FIG. 10, when a spectroradiometer 100 equipped with the conventional optical probe 90 is utilized to inspect a display panel 101 for measuring photometric quantity and chromaticity of the display panel 101, the inspection result varies with angles of inspecting.

To overcome the shortcomings of the conventional optical probe, the present invention provides an optical probe of a spectroradiometer to mitigate or obviate the aforementioned problems.

SUMMARY OF THE INVENTION

The main objective of the present invention is to provide an optical probe of a spectroradiometer that may promote accuracy of inspection result and save time from repeated measuring.

The optical probe of a spectroradiometer comprises a connecting part, a carrier, multiple optical fibers, and a lens hood. The carrier is inserted in the connecting part. The carrier has two opposite ends and a channel. The channel extends to the two opposite ends of the carrier. The multiple optical fibers are inserted in the channel of the carrier. The lens hood is connected to the connecting part. The multiple optic fibers inserted inside the channel are able to cover various orientations of oscillations of polarized light, promote accuracy of inspection result, and save a lot of time from repeatedly measuring.

Other objects, advantages, and novel features of the invention will become more apparent from the following detailed description when taken in conjunction with the accompanying drawings.

DETAILED DESCRIPTION OF PREFERRED EMBODIMENTS

Figure 1:
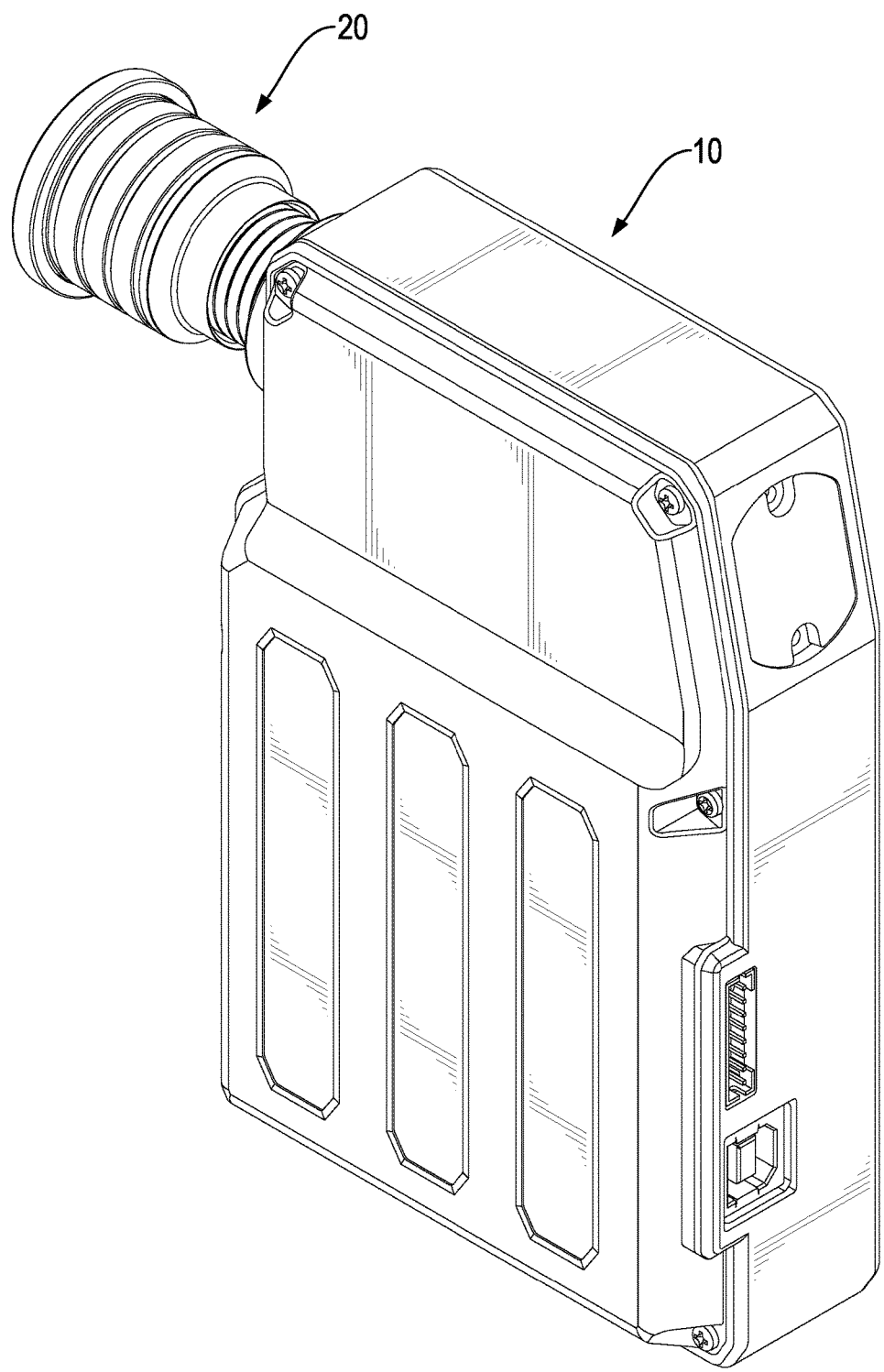
FIG. 1 is a perspective view of a first embodiment of an optical probe in accordance with the present invention, showing the optical probe connected to a spectroraiometer.
Figure 2:
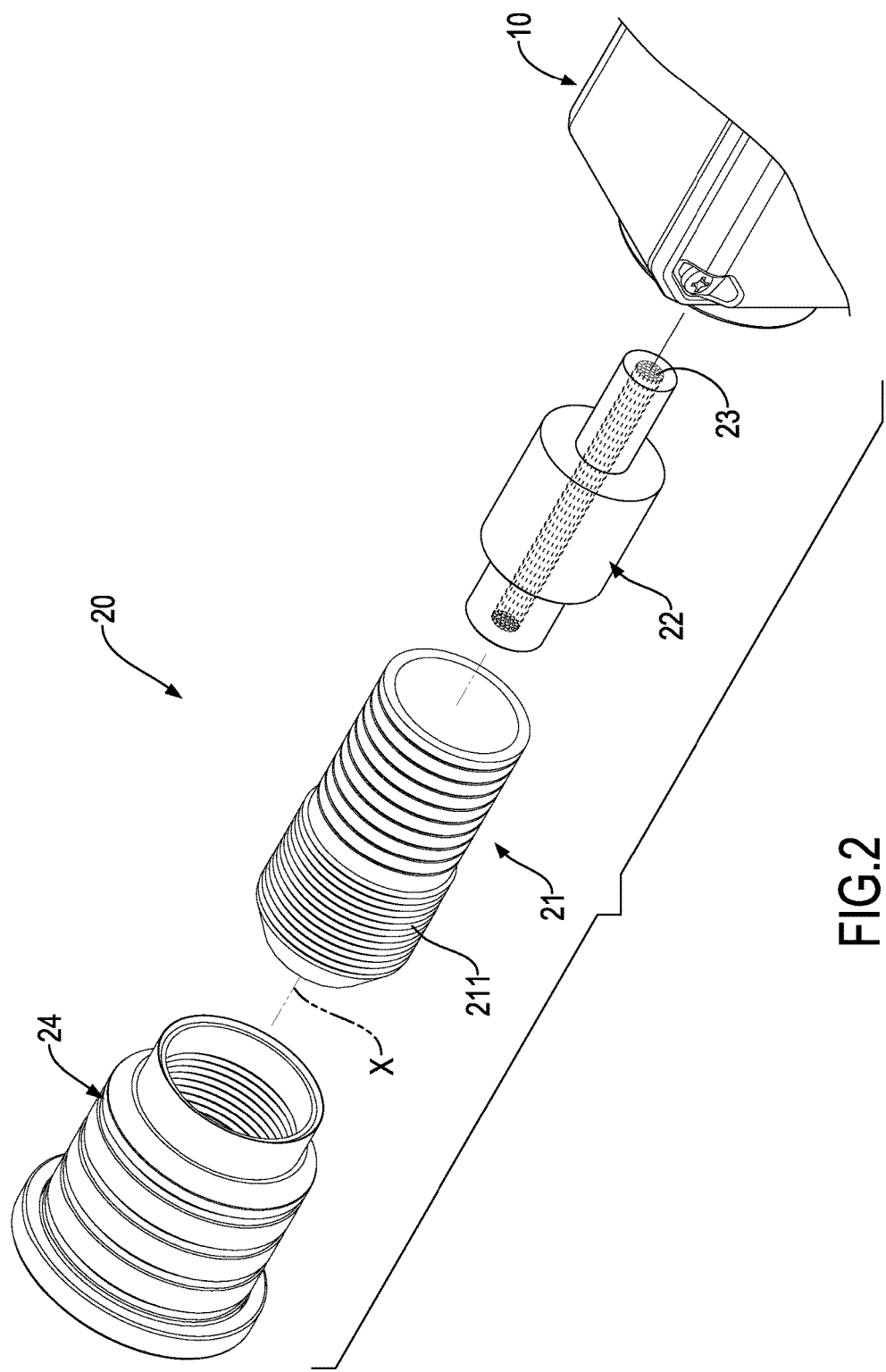
FIG. 2 is an enlarged and exploded perspective view of the optical probe in FIG. 1.

With reference to FIGS. 1 and 2, a first embodiment of a spectroradiometer with an optical probe 20 in accordance with the present invention has a main body 10 and the optical probe 20 assembled to the main body 10. The main body 10 is generally equipped with mirrors, gratings, focus lens, and sensors.

With reference to FIGS. 1 and 2, in the first embodiment of the present invention, the optical probe 20 has a connecting part 21, a carrier 22, multiple optical fibers 23, and a lens hood 24. The connecting part 21 has an axis X, two ends, and a screwing portion 211. The two ends of the connecting part 21 are opposite each other along the axis X of the connecting part 21. One of the two ends of the connecting part 21 is connected to the main body 10. The screwing portion 211 is disposed at the other one of the two ends of the connecting part 21, is distal from the main body 10, and has an external thread.

Figure 3:
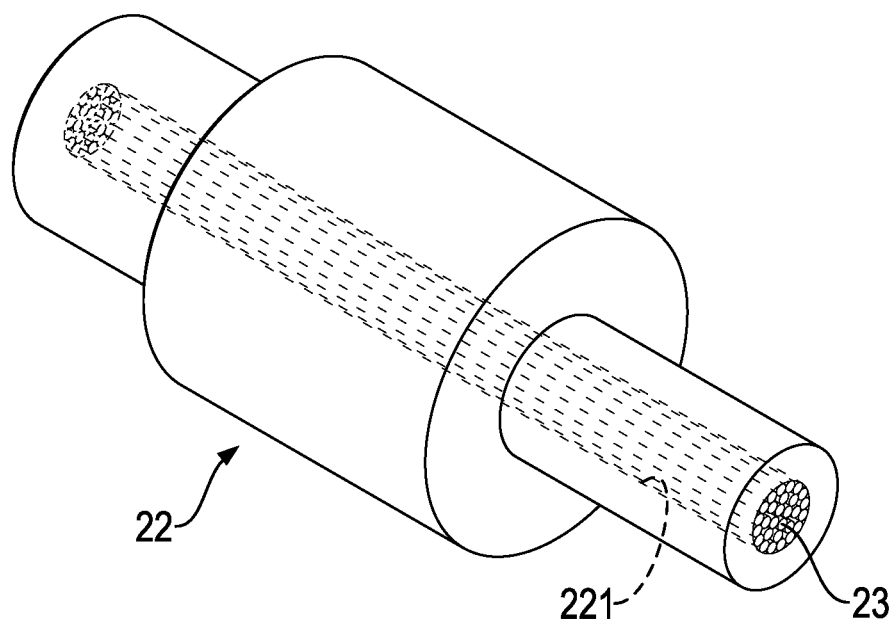
FIG. 3 is an enlarged perspective view of a carrier of the optical probe in FIG. 1.
Figure 4:
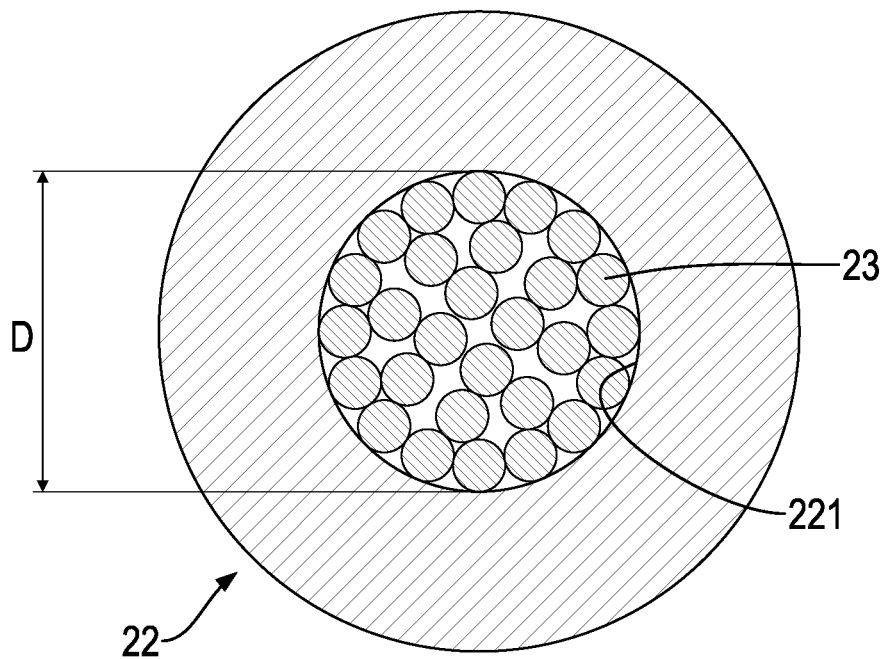
FIG. 4 is a cross sectional side view of the carrier in FIG. 3.

With reference to FIGS. 2, 3, and 4, the carrier 22 has two opposite ends and a channel 221. The channel 221 extends to the two opposite ends of the carrier 22. The carrier 22 is inserted into the connecting part 21 along the axis X of the connecting part 21. The channel 221 has a diameter D. The diameter D of the channel 221 is between not less than 0.5 millimeters and not more than 1 millimeter.

With reference to FIGS. 2, 3, and 4, the multiple optical fibers 23 are inserted into the channel 221 of the carrier 22 along the axis X of the connecting part 21. The multiple optical fibers 23 are parallel to each other. Each one of the multiple optical fibers 23 has a core with a diameter. The diameter of the core of each one of the multiple optical fibers is between not less than 25 micrometers and not more than 35 micrometers. In the first embodiment of the present invention, the multiple optical fibers 23 are not less than 20 in amount, and the diameter of the core of each one of the multiple optical fibers 23 is 30 micrometers.

With reference to FIG. 2, the lens hood 24 has an inner thread. The inner thread of the lens hood 24 is screwed with the external thread of the screwing portion 211 to combine the lens hood 24 and the connecting part 21.

Figure 5:
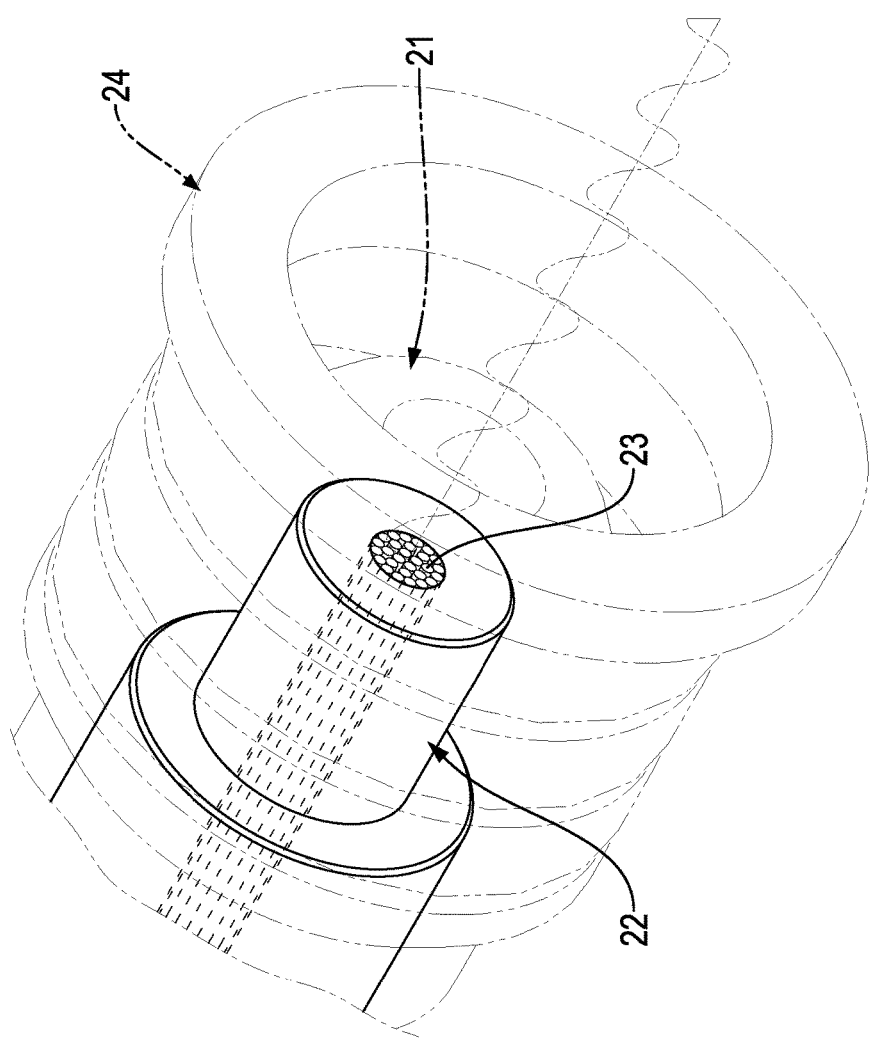
FIG. 5 is an enlarged perspective schematic view of the optical probe in FIG. 1.
Figure 6:
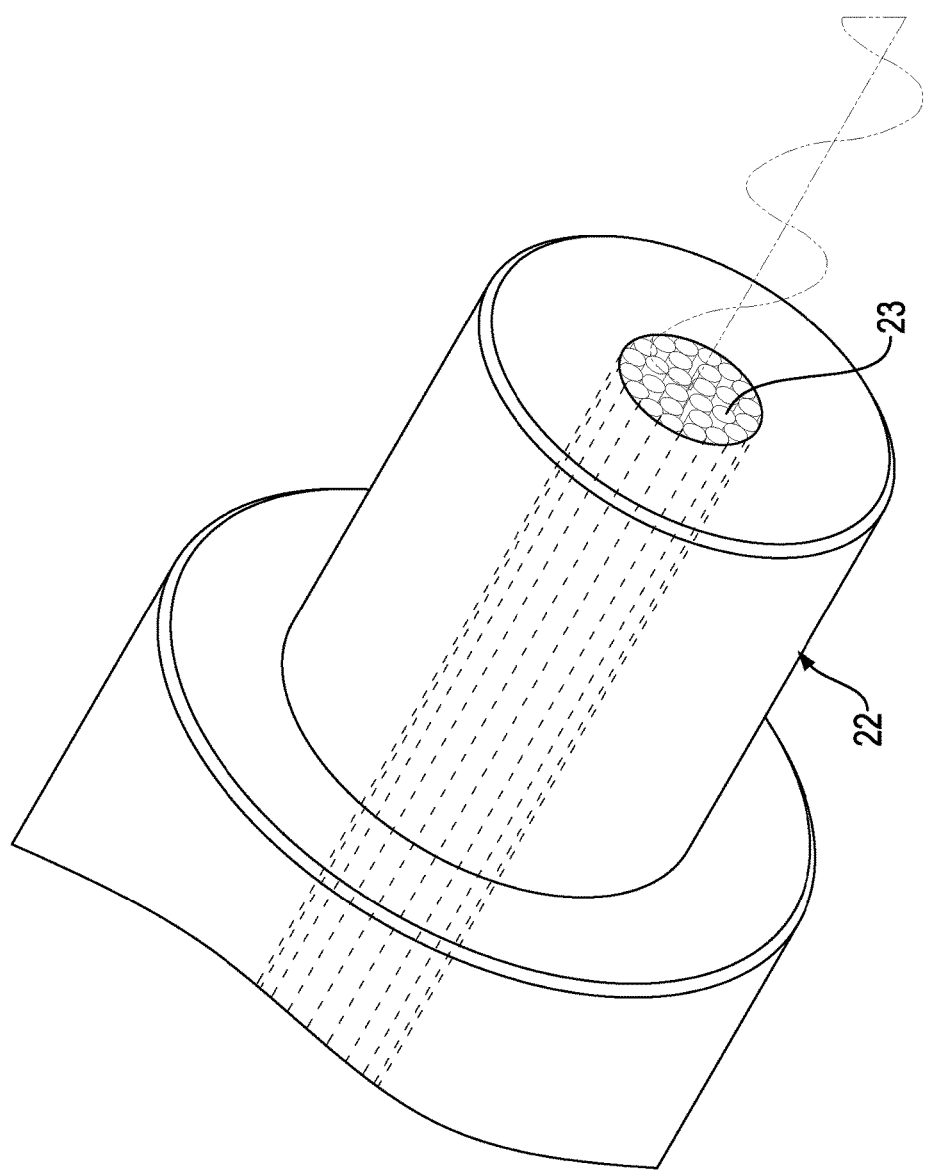
FIG. 6 is an enlarged perspective schematic view of the carrier in FIG. 3.
Figure 7:
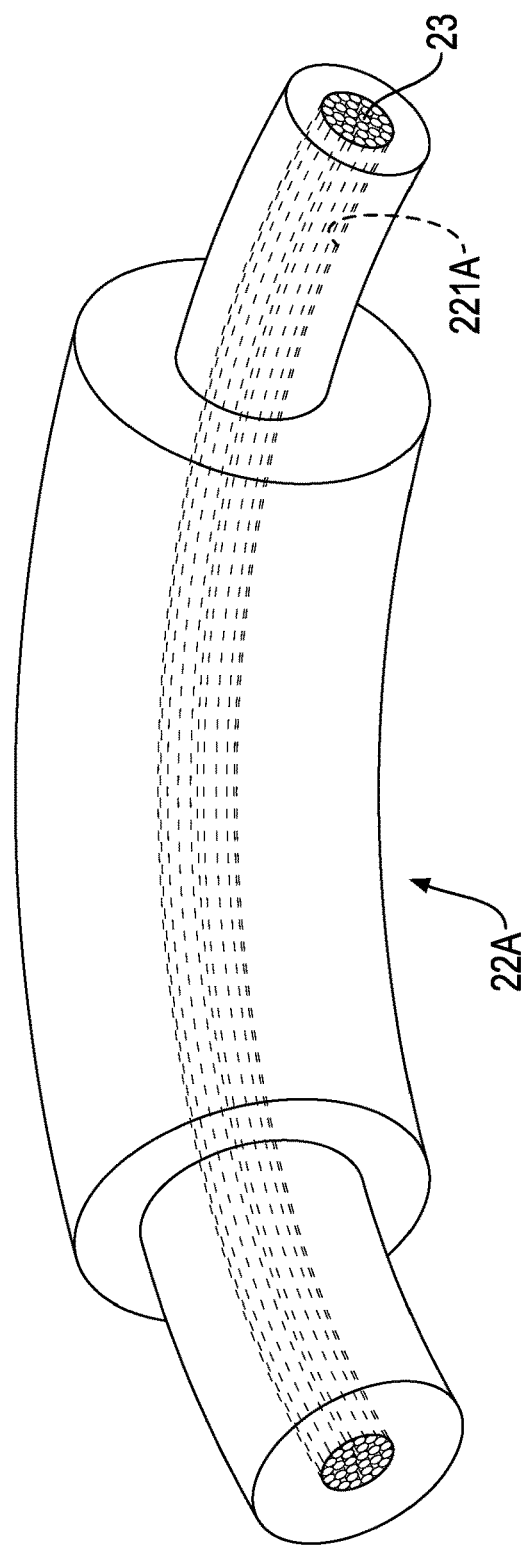
FIG. 7 is a second embodiment of an optical probe in accordance with the present invention, showing a carrier with a curved contour.
Figure 8:
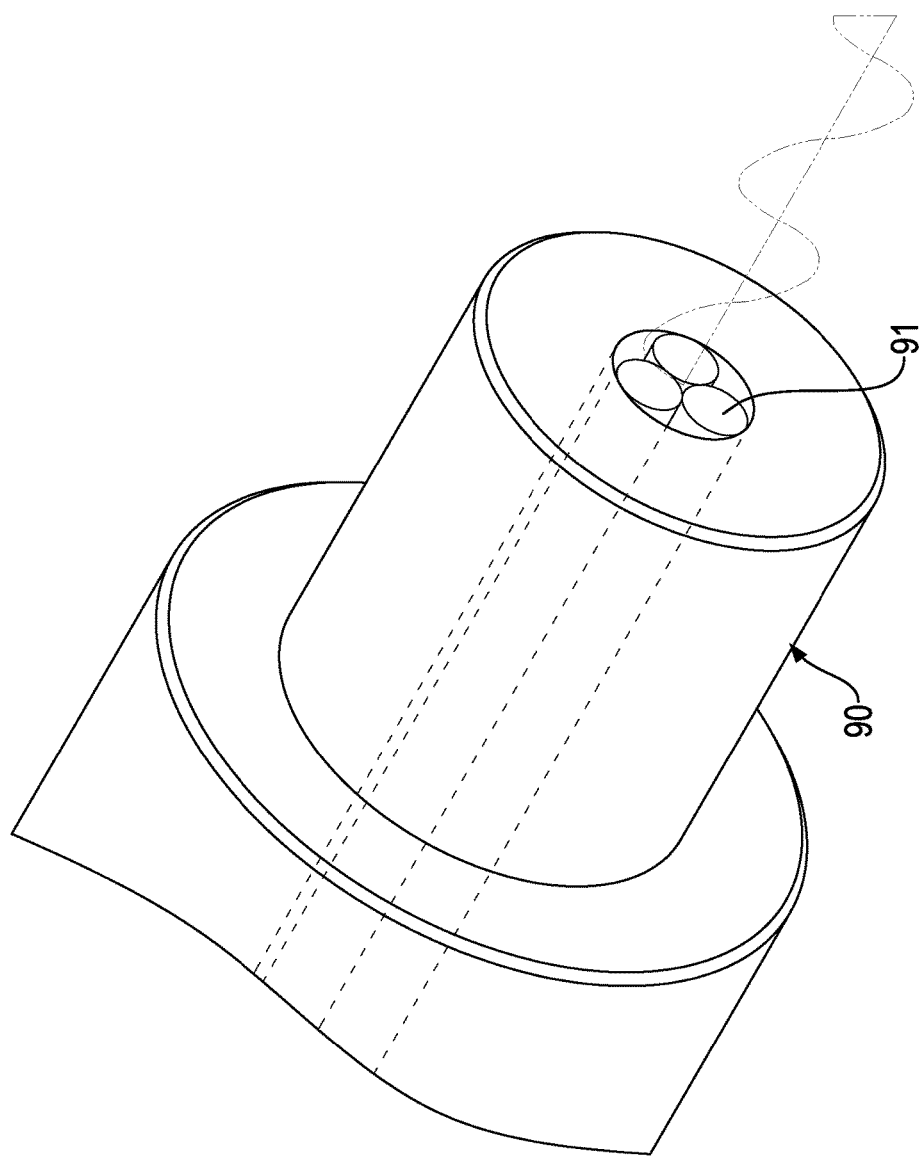
FIG. 8 is a partial perspective view of an optical probe in accordance with the prior art.
Figure 9:
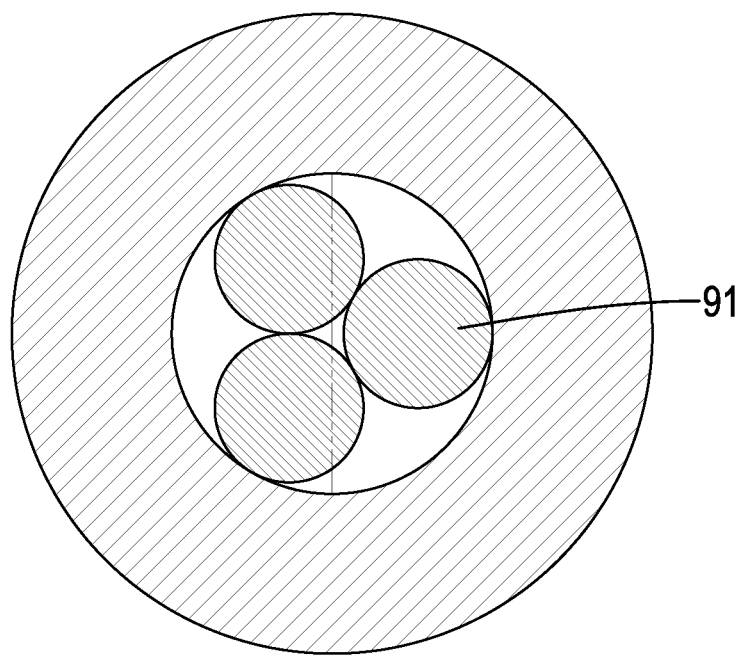
FIG. 9 is a cross sectional side view of the optical probe in FIG. 8.
Figure 10:
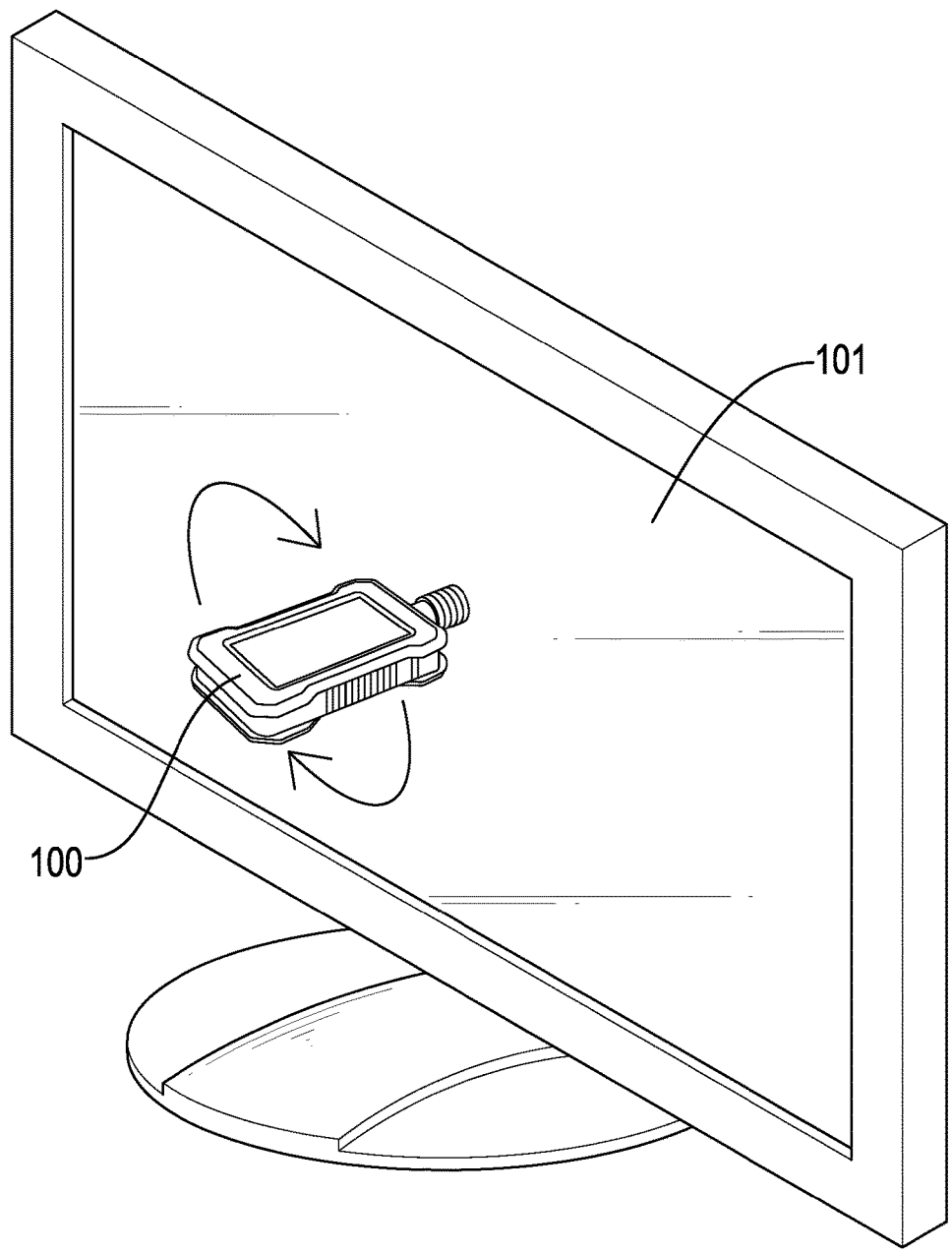
FIG. 10 is a perspective schematic view of a spectroradiometer equipped with the optical probe in FIG. 8, showing inspecting a display panel.

With reference to FIGS. 5 and 6, the spectroradiometer equipped with the optical probe 20 in accordance with the present invention is utilized to inspect a display panel. The lens hood 24 abuts against the display panel and prevents other light sources from affecting the inspection result. The light emitted by the display panel passes through the lens hood 24, the connecting part 21, and then enters the main body 10 via the multiple optic fibers 23 inserted inside the carrier 22 that is disposed inside the connecting part 21. Then, the light emitted by the display panel passes via the mirrors, the gratings, and the focus lens, eventually arriving at the sensors for analyzing.

With reference to FIGS. 1 and 2, as the light emitted by the display panel is a polarized light, the multiple optic fibers 23 filling up the channel 221 are able to cover orientations of oscillations of the light emitted by the display panel regardless of orientation of the oscillation of the light emitted by the display panel. Compared to a conventional spectroradiometer equipped with not more than three optic fibers, the multiple optic fibers 23 inserted inside the channel 221 are able to cover various orientations of oscillations of polarized light. The multiple optic fibers 23 inserted inside the channel 221 are able to diminish situations that orientations of oscillations are not fully aligned with any one of the multiple optic fibers 23 and situations that orientations of oscillations completely deviate from the multiple optic fibers 23. The multiple optic fibers 23 inserted inside the channel 221 promote accuracy of inspection results and reduce time consumed by repeated measuring. The diameter of the core of each one of the multiple optic fibers 23 is between not less than 25 micrometers and not more than 35 micrometers, thereby reducing inspection error to as little as one percent to ten percent. Furthermore, when the diameter of the core of each one of the multiple optic fibers 23 is 30 micrometers, the inspection error of the spectroradiometer equipped with the optical probe 20 in accordance with the present invention may be reduced to one percent.

A second embodiment of the present invention may also be assembled to the body 10. The second embodiment in accordance with the present invention is substantially similar with the first embodiment in accordance with the present invention. The second embodiment also has the connecting part 21, the carrier 22A inserted in the connecting part 21, the multiple optical fibers 23 inserted in the carrier 22A, and the lens hood 24 connected to the connecting part 21. In the second embodiment, the connecting part 21 may have a curved contour designed according to practical measuring requirements. The carrier 22A has a curved contour designed according to the curved contour of the connecting part 21. The channel 221A of the carrier 22A is curved for accommodating the curved contour of the carrier 22A. The multiple optic fibers 23 are inserted inside the channel 221A, which is curved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An optical probe comprising:
   a connecting part;
   a carrier inserted in the connecting part and having two opposite ends; and
      a channel extending to the two opposite ends of the carrier;
      the channel having a diameter between not less than 0.5 millimeters and not more than 1 millimeter;
      multiple optical fibers inserted in the channel of the carrier;
      a lens hood connected to the connecting part;
      each one of the multiple optical fibers extending along the connecting part and having
         two opposite ends;
         a core having a diameter;
      wherein the diameter of the core of each one of the multiple optical fibers is between not less than 25 micrometers and not more than 35 micrometers;
   the multiple optical fibers comprise not less than 20 said optical fibers; and
      one of the two opposite ends of each one of the multiple optical fibers extends toward the lens hood.

2. The optical probe as claimed in claim 1, wherein the channel is curved.

3. The optical probe as claimed in claim 1, wherein the diameter of the core of each one of the multiple optical fibers is 30 micrometers.

4. The optical probe as claimed in claim 2, wherein the diameter of the core of each one of the multiple optical fibers is 30 micrometers.

5. The optical probe as claimed in claim 3, wherein the connecting part has two opposite ends, and the lens hood is connected to one of the two opposite ends of the connecting part.

6. The optical probe as claimed in claim 4, wherein the connecting part has two opposite ends, and the lens hood is connected to one of the two opposite ends of the connecting part.

7. The optical probe as claimed in claim 3, wherein the connecting part has two opposite ends, and the lens hood is connected to one of the two opposite ends of the connecting part.

8. The optical probe as claimed in claim 4, wherein the connecting part has two opposite ends, and the lens hood is connected to one of the two opposite ends of the connecting part.

9. The optical probe as claimed in claim 5, wherein
   the connecting part has a screwing portion with an external thread; and
   the lens hood has an inner thread screwed with the external thread of the connecting part.

10. The optical probe as claimed in claim 6, wherein
    the connecting part has a screwing portion with an external thread; and
    the lens hood has an inner thread screwed with the external thread of the connecting part.

11. The optical probe as claimed in claim 7, wherein
    the connecting part has a screwing portion with an external thread; and
    the lens hood has an inner thread screwed with the external thread of the connecting part.

12. The optical probe as claimed in claim 8, wherein
the connecting part has a screwing portion with an external thread; and
the lens hood has an inner thread screwed with the external thread of the connecting part.

* * * * *